United States Patent
Yoshikuni et al.

(10) Patent No.: US 8,664,918 B2
(45) Date of Patent: Mar. 4, 2014

(54) CURRENT CONTROL CIRCUIT

(75) Inventors: Masato Yoshikuni, Tama (JP);
Tomomitsu Ohara, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 357 days.

(21) Appl. No.: 13/249,576

(22) Filed: Sep. 30, 2011

(65) Prior Publication Data
US 2012/0081154 A1    Apr. 5, 2012

(30) Foreign Application Priority Data
Oct. 1, 2010    (JP) ................. 2010-223551

(51) Int. Cl.
*H02J 7/00*    (2006.01)
(52) U.S. Cl.
USPC .......................... 320/128; 320/103; 320/164
(58) Field of Classification Search
USPC ....................................................... 320/128
See application file for complete search history.

(56) References Cited

U.S. PATENT DOCUMENTS

| | | | |
|---|---|---|---|
| 8,450,982 B2* | 5/2013 | Matsuda et al. | 320/150 |
| 2006/0284671 A1* | 12/2006 | Ohba | 330/9 |
| 2009/0033293 A1* | 2/2009 | Xing et al. | 320/164 |
| 2009/0302805 A1* | 12/2009 | Motoichi et al. | 320/164 |
| 2012/0019231 A1* | 1/2012 | Chen | 323/312 |

FOREIGN PATENT DOCUMENTS

JP    2009-294981 A    12/2009

* cited by examiner

*Primary Examiner* — Arun Williams
(74) *Attorney, Agent, or Firm* — Holtz, Holtz, Goodman & Chick (57) ABSTRACT

A plurality of current control MOS transistors and a plurality of current detection systems are provided, each of the current detection systems including a current detection transistor current-mirror connected to the current control MOS transistor and a current-voltage converter connected in series to the current detection transistor. The current detection systems are switched between one another for operation in response to the intensity of a charging current flowing through the current control transistors.

16 Claims, 7 Drawing Sheets

FIG. 7C

CURRENT CONTROL CIRCUIT

BACKGROUND OF THE INVENTION

1. Field of the Invention

The present invention relates to a current control circuit including a current detection circuit and performing control in response to detected current. The present invention relates to, for instance, a technique effectively used in a charging control IC (semiconductor integrated circuit) on which a charging control circuit is mounted for charging a secondary battery.

2. Description of Related Art

A charging device of a secondary battery includes an IC on which a charging control circuit is mounted to control charging current. The charging current is controlled by a current control transistor composed of a MOSFET (insulated gate field effect transistor, hereinafter referred to as MOS transistor) provided between an input terminal to which a DC voltage is input from a primary power source, such as an AC adaptor, and an output terminal to which a secondary battery is connected.

In such a conventional charging control IC, a current flowing through the current control transistor is detected during a charging operation to control the charging current to be constant. A known method of detecting the charging current in such a constant current control mode is that a sense resistor for current detection is connected in series to the current control transistor to detect the current based on the voltage drop in the resistor Although the method relatively precisely detects the current, a large current flowing through the sense resistor causes a large power loss in the sense resistor, thus reducing the power efficiency.

To address the circumstance, the following method of detecting current has been proposed: a smaller transistor is provided in parallel to the current control transistor; the gate voltage identical to that of the current control transistor is applied to generate a current reduced in proportion to the charging current in a current mirror circuit; the generated current is applied to the sense resistor to detect current based on the voltage drop in the resistor. The method enhances the power efficiency because only a small current flows through the sense resistor. Due to fluctuation in load, however, bias conditions of a current detection transistor are different from those of the current control resistor. Thus, a current reduced precisely in proportion to the charging current cannot be provided, resulting in low detection accuracy.

Figure 6:
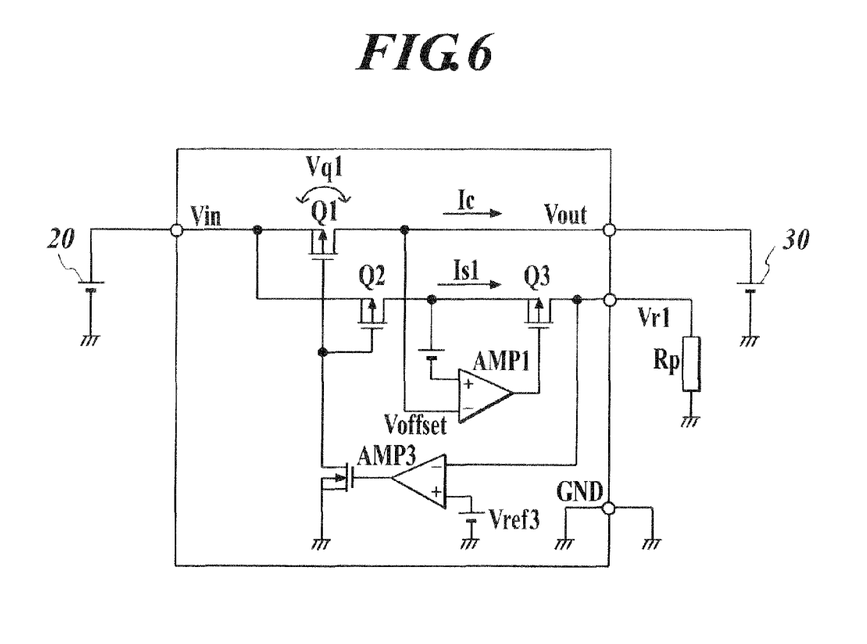
FIG. 6 is a circuit diagram illustrating a configuration of a typical conventional charging control circuit.

As shown in FIG. 6, Japanese Unexamined Patent Application Publication No. 2009-294981 discloses an invention relating to a circuit that includes a bias control transistor Q3 disposed in series to a current detection transistor Q2 which is current-mirror connected to a current control transistor Q1 and a differential amplifier AMP1 receiving the drain voltages of the current control transistor Q1 and the current detection transistor Q2 as an input and having an output terminal connected to a gate terminal of the bias control transistor Q3. The virtual short of the differential amplifier provides bias conditions of the current detection transistor Q2 identical to those of the current control transistor Q1, thus enhancing current detection accuracy.

Figure 7A:
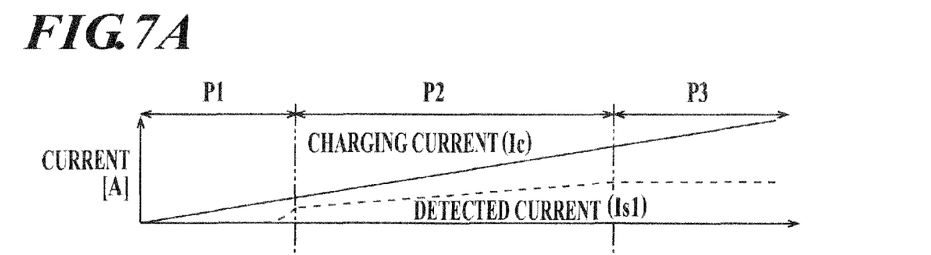
FIGS. 7A-7C include graphs each illustrating a change in a charging current Ic, a change in a current detection voltage, and a difference in voltage between primary and secondary batteries in the conventional charging control IC in FIG. 6.
Figure 7B:
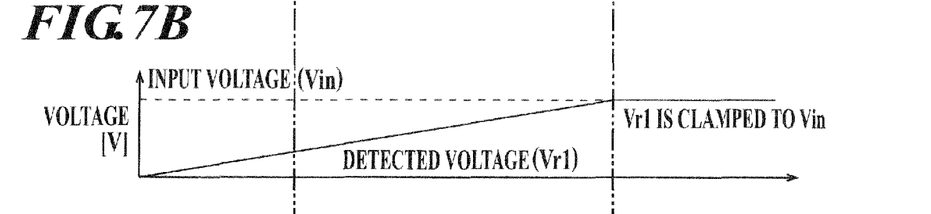
Figure 7C:
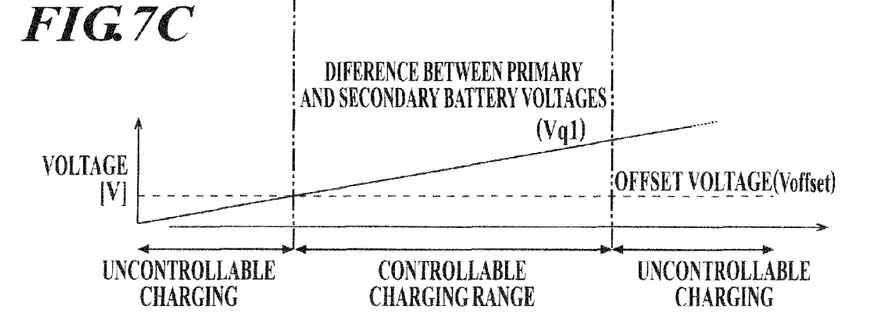

No problem arises in the charging control circuit disclosed in Japanese Unexamined Patent Application Publication No. 2009-294981 in the case of a primary power source that generates relatively stable voltage and current, such as an AC adaptor. Problems arise, however, with a primary power source having variable voltage and current, such as a solar battery. Specifically, first, in the case of an extremely small charging current due to a limited amount of solar radiation, a difference in voltage between a primary source 20 and a secondary battery 30, specifically a difference in voltage Vq1 between the source and drain of the current control transistor Q1 is very small. Thus, the charging current cannot be precisely detected due to an effect of offset voltage of the differential amplifier AMP1. Second, with a widened range of a controllable charging current, a voltage detected in a resistor Rp for current-voltage conversion is too high at a high charging current. Thus, a detected voltage Vr1 is clamped to an input voltage Vin as in a range P3 in FIG. 7B, leading to uncontrollable current.

SUMMARY OF THE INVENTION

In view of such circumstances, an object of the present invention is to provide a current control circuit that detects a current flowing through a current control MOS transistor in a current mirror method and that precisely controls the current even in the case where a controllable charging-current range is widened.

According to an aspect of the present invention, there is provided a current control circuit comprising: a first current control MOS transistor and a second current control MOS transistor that are connected in parallel to each other between a voltage input terminal and an output terminal and that control a current flowing from the voltage input terminal to the output terminal; a current detection circuit comprising: a first current detection MOS transistor that has a smaller size than the first current control MOS transistor, and whose source terminal is connected to a source terminal of the first current control MOS transistor; and a second current detection MOS transistor that has a smaller size than the second current control MOS transistor, and whose source terminal is connected to a source terminal of the second current control MOS transistor, wherein a same gate voltage is applied to a gate terminal of the first current detection MOS transistor and a gate terminal of the second current detection MOS transistor; a first terminal to which a first current-voltage converter connected in series to the first current detection MOS transistor is connected; and a second terminal to which a second current-voltage converter connected in series to the second current detection MOS transistor is connected; and a gate voltage control circuit that controls gate voltages of the first and second current control MOS transistors according to a current value detected in the current detection circuit, wherein a control state of the current control circuit includes a first control state where an output from the gate voltage control circuit is applied to a control terminal of the first current control MOS transistor and a control terminal of the first current detection MOS transistor, and a second control state where the output from the gate voltage control circuit is applied to a control terminal of the second current control MOS transistor and a control terminal of the second current detection MOS transistor.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

A preferred embodiment of the present invention is described below with reference to the attached drawings.

Figure 1:
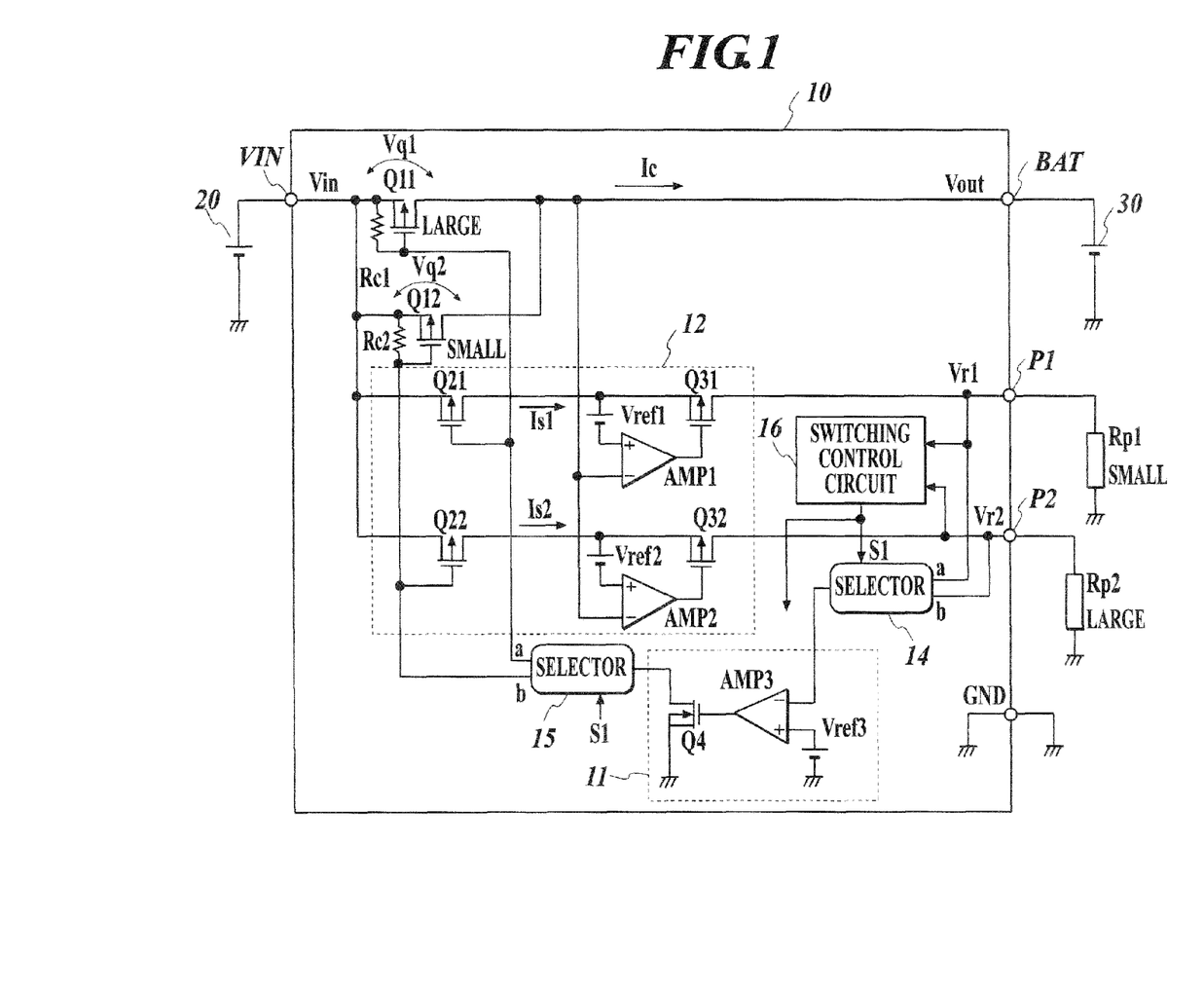
FIG. 1 is a circuit diagram illustrating an embodiment of a configuration of a charging control IC to which a current control circuit of the present invention is applied and a charging device having the IC.

FIG. 1 illustrates an embodiment of a schematic configuration of a charging control IC of a secondary battery to which a current control circuit of the present invention is applied and a charging device including the IC.

As shown in FIG. 1, the charging device of the embodiment includes a primary power source 20, such as a solar battery; and a charging control IC 10 that charges a secondary battery 30, such as a lithium-ion battery, with a DC voltage Vin input from the primary power source 20.

The charging control IC 10 has a voltage input terminal VIN receiving the DC voltage Vin from the primary power source 20; a battery terminal BAT as an output terminal to which the secondary battery 30 to be charged is connected; current control MOS transistors Q11 and Q12 provided in parallel to each other and each composed of a P-channel MOSFET provided between the voltage input terminal VIN and the battery terminal BAT; a gate voltage control circuit 11 generating a gate control voltage of each of the current control MOS transistors Q11 and Q12; and a current detection circuit 12 detecting the current of each of the current control MOS transistors Q11 and Q12 in a current mirror method. The transistors Q11 and Q12 have sizes different from each other.

The current detection circuit 12 has a current detection MOS transistor Q21 constituting a current mirror circuit with the current control MOS transistor Q11; a current detection MOS transistor Q22 constituting a current mirror circuit with the current control MOS transistor Q12; bias state control MOS transistors Q31 and Q32 connected in series to the current detection MOS transistors Q21 and Q22, respectively; and error amplifiers AMP1 and AMP2 each detecting voltage depending on the detected current. Drain terminals of the bias state control MOS transistors Q31 and Q32 are connected to external terminals P1 and P2, respectively, to which current detection resistors Rp1 and Rp2, respectively, are connected in the exterior of the chips thereof. The resistors Rp1 and Rp2 convert the current flowing through the transistors Q21 and Q22, respectively, into voltage. Technically, the resistors Rp1 and Rp2 are also included in the current detection circuit 12.

The current detection MOS transistor Q21 has a gate whose width is 1/N in size of the current control MOS transistor Q11, and has a source terminal connected to the voltage input terminal VIN. Voltage identical to that in the current control MOS transistor Q11 is applied to a control terminal (gate terminal) of the current detection MOS transistor Q21. Thus, the current detection MOS transistor Q21 supplies a current having an intensity of 1/N of the drain current of the current control MOS transistor Q11. The current detection MOS transistor Q22 has a gate whose width is 1/N in size of the current control MOS transistor Q12, and has a source terminal connected to the voltage input terminal VIN. Voltage identical to that in the current control MOS transistor Q12 is applied to a control terminal (gate terminal) of the current detection MOS transistor Q22. Thus, the current detection MOS transistor Q22 supplies a current having an intensity of 1/N of the drain current of the current control MOS transistor Q12. The ratio N in size may be a value between approximately several hundreds and several thousands, for example. This allows a current flowing through the current detection MOS transistors Q21 and Q22 to be very small, thus reducing a loss in the current detection resistors (Rp1 and Rp2).

The error amplifier AMP1 receives the drain voltage of the current control MOS transistor Q11 and the drain voltage of the current detection MOS transistor Q21 as an input. The bias state of the current detection MOS transistor Q21, i.e., the voltage between the source and drain thereof is made to be identical to the voltage between the source and drain of the current control MOS transistor Q11 in such a way that a voltage according to the potential difference between the drain voltages of the current control MOS transistor Q11 and the current detection MOS transistor Q21 is applied to a gate terminal of the bias state control MOS transistor Q31. Thus, a current more precisely proportional to the drain current of the current control MOS transistor Q11 is supplied to the current detection MOS transistor Q21.

The error amplifier AMP2 receives the drain voltage of the current control MOS transistor Q12 and the drain voltage of the current detection MOS transistor Q22. The bias state of the current detection MOS transistor Q22, i.e., the voltage between the source and drain thereof is made to be identical to the voltage between, the source and drain of the current control MOS transistor Q12 in such a way that a voltage according to the potential difference between the drain voltages of the current control MOS transistor Q12 and the current detection MOS transistor Q22 is applied to agate terminal of the bias state control MOS transistor Q32. Thus, a current more precisely proportional to the drain current of the current control MOS transistor Q12 is supplied to the current detection MOS transistor Q22.

In the charging control IC 10 of the embodiment, the transistors Q11 and Q12 are provided so as to be Q11>Q12 in size, while the resistors Rp1 and Rp2 connected to the external terminals P1 and P2, respectively, are provided so as to be Rp1<Rp2 in resistance. At a time of a large charging current, the current flows in the resistor Rp1 through the current detection MOS transistor Q21; whereas, at a time of a small charging current, the current flows in the resistor Rp2 through the current detection MOS transistor Q22. This prevents the voltage from increasing excessively during conversion of the current flowing in the resistor Rp1 into voltage at a time of a large charging current, and prevents the voltage from decreasing excessively during conversion of the current flowing in the resistor Rp2 into voltage at a time of a small charging current.

The charging control IC 10 includes an error amplifier AMP3 and a gate voltage control transistor Q4. The error amplifier AMP3 outputs a voltage in accordance with a potential difference between a voltage into which a current is converted by the resistor Rp1 or Rp2 and a reference voltage Vref3. The gate voltage control transistor Q4 is connected between the gate terminals of the current control MOS transistors Q11 and Q12 and a ground point. By applying the output voltage of the error amplifier AMP3 to the gate terminal of the gate voltage control transistor Q4, the gate voltage of each of the current control MOS transistors Q11 and Q12 is controlled in response to a detected current value. Specifically, the gate voltage control circuit 11 is composed of the error amplifier AMP3 and the transistor Q4.

Resistors Rc1 and Rc2 having high resistances are connected between the gate terminals of the current control MOS transistors Q11 and Q12 and the input terminal, respectively. The drain current of the transistor Q4 is supplied to the resistors Rd1 and Rc2 and is converted into voltage. By applying the voltage to each of the gate terminals of the current control MOS transistors Q11 and Q12, control is performed so that the current in accordance with the output voltage of the error amplifier AMP3 flows through each of the current control MOS transistors Q11 and Q12.

Furthermore, the charging control IC 10 has a selector 14, a selector 15, and a switching control circuit 16. The selector 14 selectively supplies a current detection voltage Vs1 or Vs2 converted by the resistor Rp1 or Rp2, respectively, to the error amplifier AMP3. The selector 15 selectively supplies the output voltage of the error amplifier AMP3 to the gate terminals of the current control MOS transistor Q11 and the current detection transistor Q21 or to the gate terminals of the current control MOS transistor Q12 and the current detection transistor Q22. The switching control circuit 16 monitors the voltages Vr1 and Vr2 converted by the resistors Rp1 and Rp2, respectively, and generates a switching control signal S1 to switch between the selectors 14 and 15.

The switching control circuit 16 may include two comparators that compare the voltages converted by the resistors Rp1 and Rp2 with respective predetermined reference voltages and a logic circuit that generates the switching control signal S1 based on the output from these comparators.

Switching control of the selectors 14 and 15 in accordance with the switching control signal S1 is described below with reference to FIGS. 2 and 3A-3D.

Figure 2:
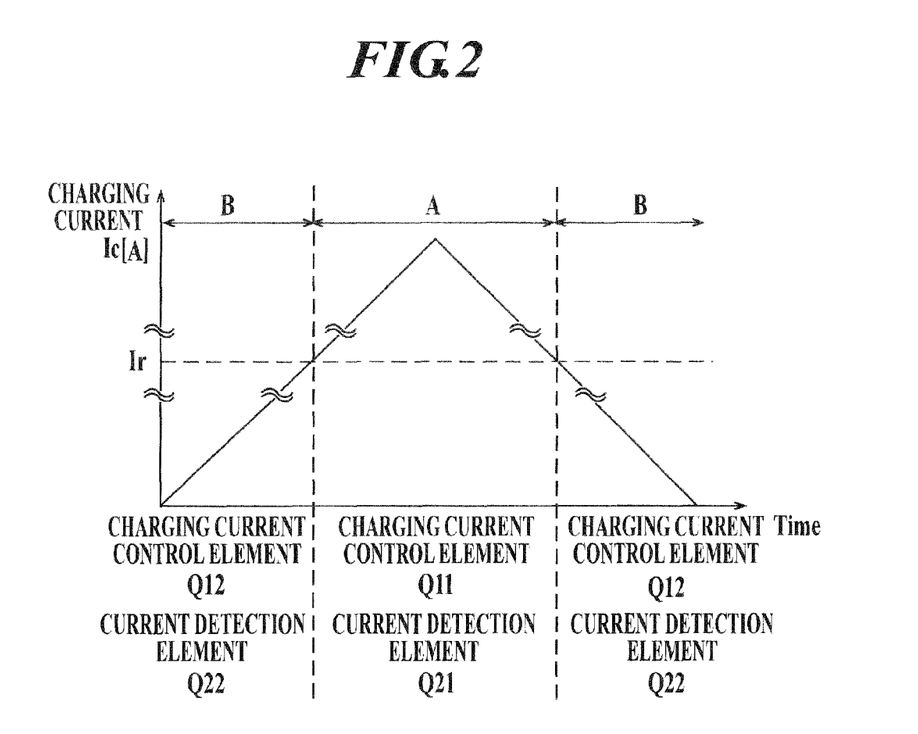
FIG. 2 is a graph illustrating a relationship among a change in a charging current Ic associated with variation of the amount of solar radiation incident on a solar battery, a selected state of a selector, and a transistor in an ON state in the charging control IC according to an embodiment.

FIG. 2 illustrates a relationship among a change in a charging current Ic in the case where the amount of solar radiation incident on a solar battery (primary power source 20) increases and then decreases as time elapses, a selected state of the selectors 14 and 15, and a transistor set in an ON state.

In a term B where the charging current Ic is lower than a predetermined current Ir, the selectors 14 and 15 are controlled so as to select a terminal b in FIG. 1. The current detection voltage Vr2 converted by the resistor Rp2 is supplied to the error amplifier AMP3. The drain voltage of the transistor Q4 is applied to the gate terminals of the current control MOS transistor Q12 and the current detection MOS transistor Q22. Thus, the current control MOS transistor Q12 and the current detection MOS transistor Q22 having a small size are switched to an ON state.

Thereby, the current from the input terminal IN is supplied to the battery terminal BAT through the current control MOS transistor Q12 to charge the secondary battery 30. Concurrently, the current is supplied to the resistor Rp2 having a high resistance. Even if the current value is somewhat small, a voltage higher than the offset voltages of the current detection amplifiers AMP1 and AMP2 is generated in the external terminal P2 and is supplied to the error amplifier AMP3. Accordingly, highly accurate current control is achieved by the current detection circuit 12 even in the state of a small charging current.

In contrast, in a term A where the charging current Ic is higher than the predetermined current Ir, the selectors 14 and 15 are controlled so as to select a terminal a in FIG. 1. The current detection voltage Vs1 converted by the resistor Rp1 is supplied to the error amplifier AMP3. The drain voltage of the transistor Q4 is applied to the gate terminals of the current control MOS transistor Q11 and the current detection MOS transistor Q21. Thus, the current control MOS transistor Q11 and the current control MOS transistor Q21 having a large size are switched to an ON state.

Thereby, the current from the input terminal VIN is supplied to the battery terminal BAT through the current control MOS transistor Q11 to charge the secondary battery 30. Concurrently, the current is supplied to the resistor Rp1 having a low resistance. Even if the current value is large, a relatively low voltage is generated in the external terminal P1 and is supplied to the error amplifier AMP3. Accordingly, the current detection voltage Vr1 is not clamped to the input voltage Vin but exceeds the input voltage Vin even in a state of large charging current. Thus, highly accurate current control can be achieved by the current detection circuit 12 in a wide current range.

Figure 3A:
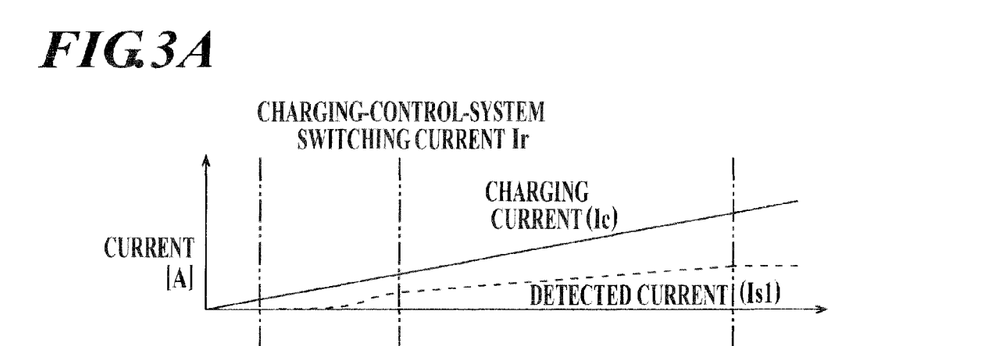
FIGS. 3A-3D include graphs each illustrating a change in a charging current Ic and a detected current Is1, a change in a charging current Ic and a detected current Is2, changes in current detection voltages Vr1 and Vr2, and changes in voltage differences Vq1 and Vq2 of primary and secondary batteries, respectively, in a conventional charging control IC (FIG. 6) and in the charging control IC of an embodiment of the present invention.
Figure 3B:
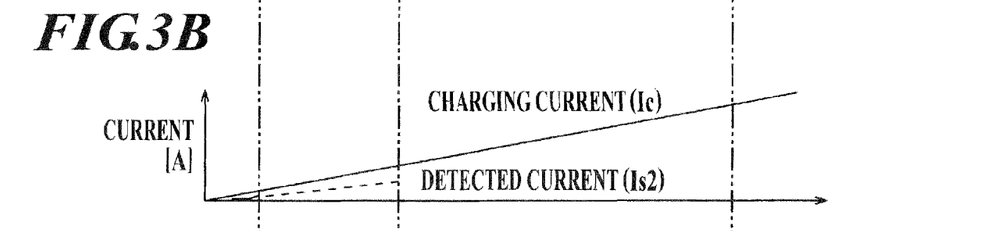
Figure 3C:
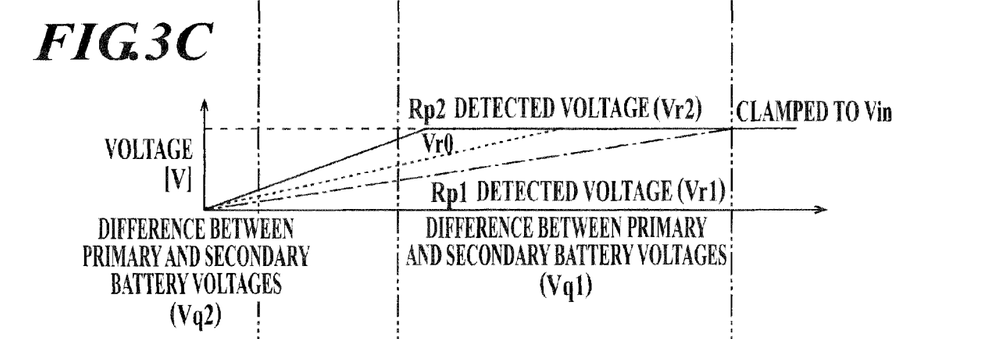
Figure 3D:
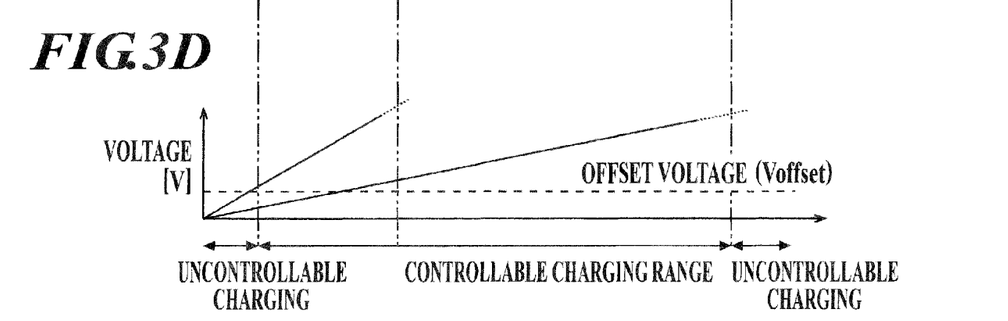

Specifically, the detection voltage Vr2 converted by the resistor Rp2 is higher than a conventional detection voltage Vr0 (broken line), as shown by a solid line in FIG. 3C. The detection voltage Vr1 converted by the resistor Rp1 is lower than the conventional detection voltage Vr0 (broken line), as shown by a dashed-dotted line in FIG. 3C. Thus, there is an advantage that the controllable charging range is widened in both an area of small charging current and an area of large charging current than the conventional range.

Figure 4:
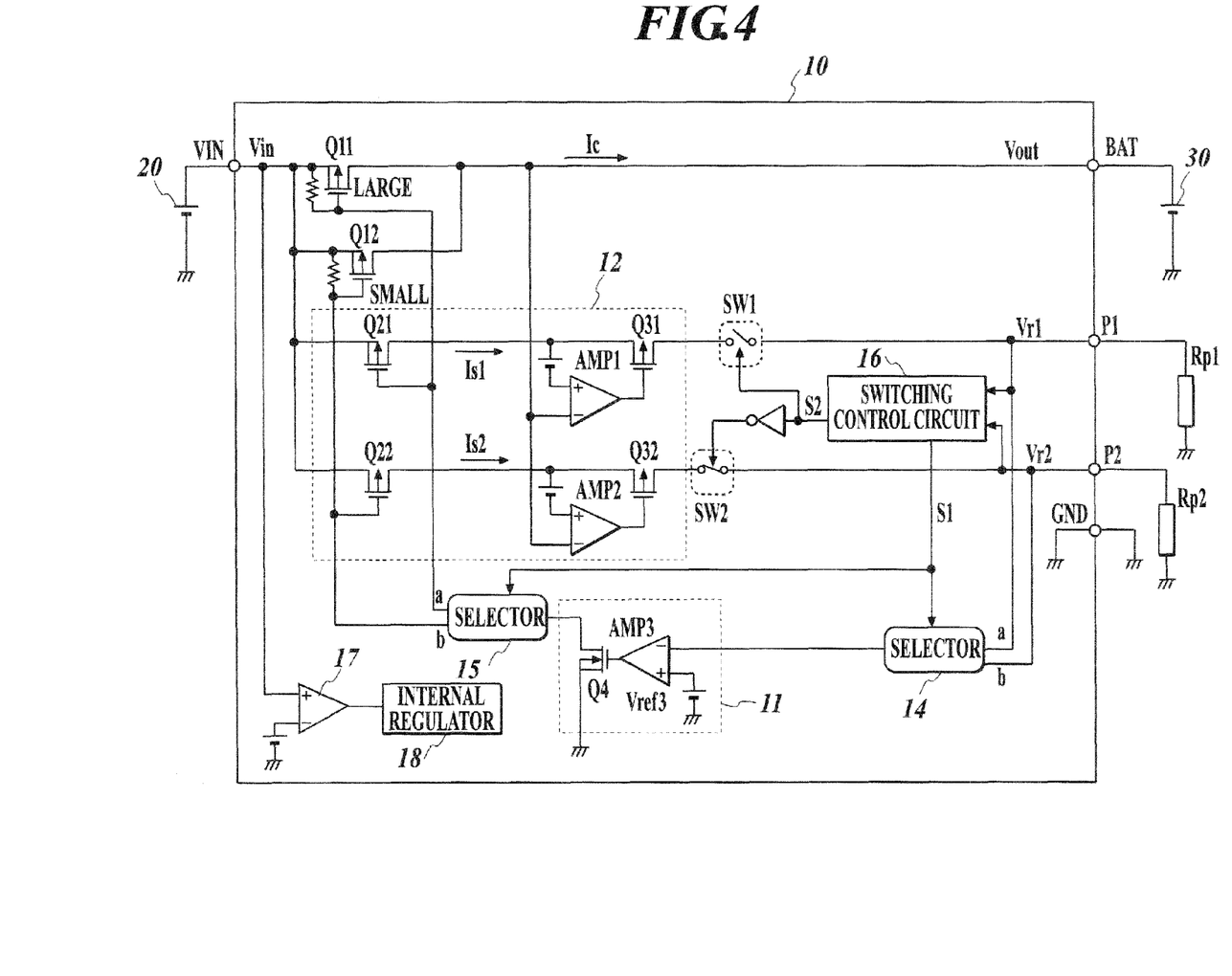
FIG. 4 is a circuit diagram illustrating a configuration of a first modification of the charging control IC of an embodiment.

FIG. 4 illustrates a modification of the charging control IC 10 of the embodiment. As shown in FIG. 4, on/off switches SW1 and SW2 are provided between the bias state control MOS transistors Q31 and Q32 and the external terminals P1 and P2, respectively, to which the current detection resistors Rp1 and Rp2, respectively, are connected in the modification. The on/off switches SW1 and SW2 are turned on or off in a complementary manner in response to a control signal S2 from the switching control circuit 16 and its inverted signal.

Specifically, in a state where the selectors 14 and 15 select the terminal a according to the control signal S1 from the switching control circuit 16, the switch SW1 is in an ON state and the switch SW2 is in an OFF state, while in a state where the selectors 14 and 15 select the terminal b, the switch SW2 is in an ON state and the switch SW1 is in an OFF state. This operation prevents the current from flowing wastefully through the current detection resistor Rp1 or Rp2 which is not in use.

The current control IC 10 of the modification includes a comparator (voltage monitor) 17 that monitors the input voltage Vin. If the input voltage Vin is reduced to a predetermined voltage (voltage at the lower limit of the controllable charging range in FIGS. 3A-3D) or lower, an internal regulator 18 generating power voltage in the IC is deactivated. Thus, in the case where the input voltage Vin is equal to or lower than the voltage of the lower limit of the controllable charging range, the charging current is shut off to prevent the IC from operating out of the controllable charging range.

In the modification in FIG. 4, the internal regulator 18 is deactivated when an input voltage Vin is equal to or lower than the predetermined voltage. Alternatively, a current source (e.g., current source of an amplifier) may be turned off so as not to supply operating current to the current detection circuit and the gate voltage control circuit.

Figure 5:
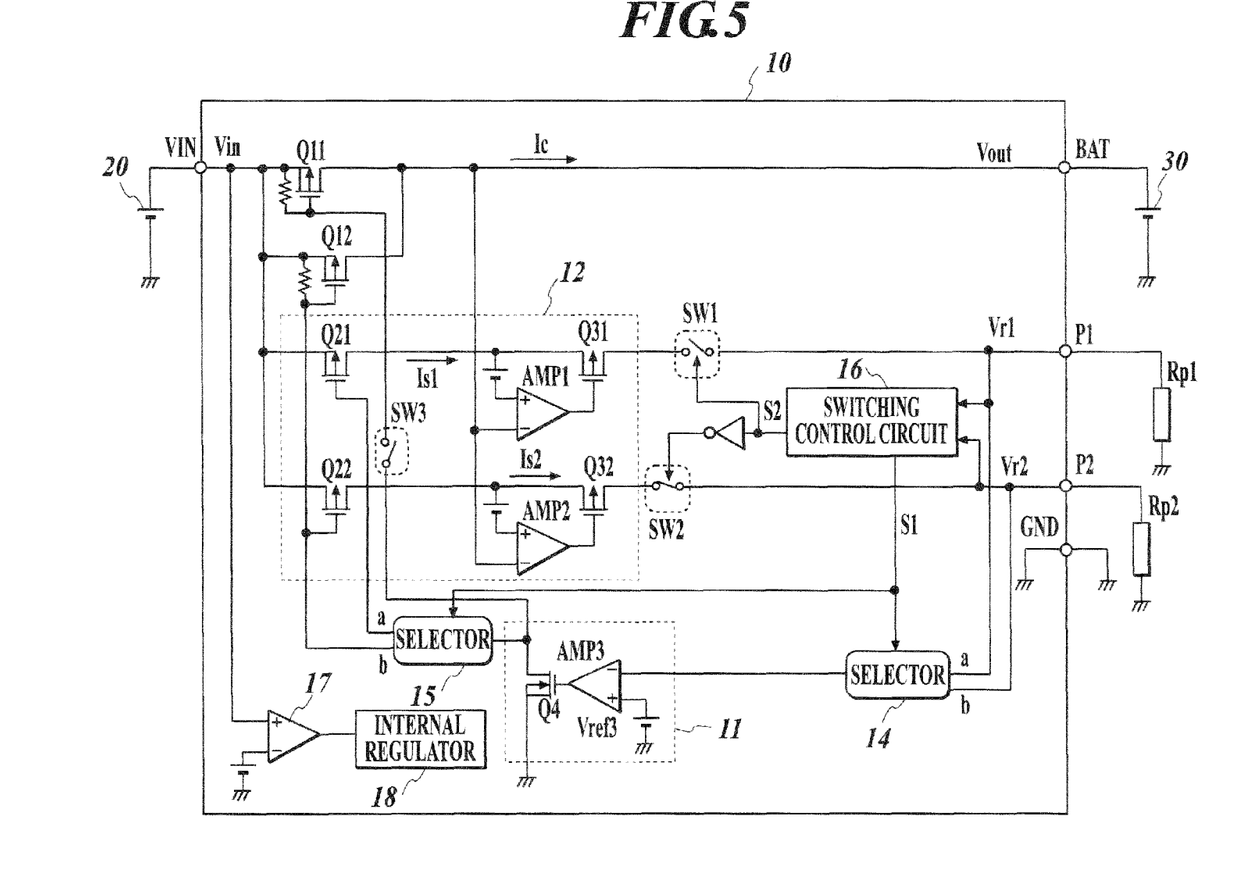
FIG. 5 is a circuit diagram illustrating a configuration of a second modification of the charging control IC of an embodiment.

FIG. 5 illustrates a second modification of the charging control IC 10 of the embodiment.

In the second modification, the combined size or current control MOS transistors Q11 and Q12 is the same as the size of the transistor Q11 in FIG. 1, instead of the sizes of the current control MOS transistors Q11 and Q12 being provided as Q11>Q12. An on/off switch SW3 is provided between the gate terminal of the current control MOS transistor Q11 and the transistor Q4. With the terminal a selected by the selectors 14 and 15, the switch SW3 is in an ON state, while with the terminal b selected by the selectors 14 and 15, the switch SW3 is in an OFF state.

Specifically, in the second modification, both the current control MOS transistors Q11 and Q12 are set to be ON at a time of a large charging current, while only the current control MOS transistor Q12 is in an ON state at a time of a small charging current.

The embodiment of the present invention has been described above. The present invention, however, is not limited to the embodiment and a variety of modifications can be made. For example, in the embodiment, the ratio in size of the current control MOS transistor Q11 and the current detection MOS transistor Q21 and the ratio in size of the current control MOS transistor Q12 and the current detection MOS transistor Q22 are identical (1/N). The ratio in size of the transistors Q11 and Q12 and the ratio in size of the transistors Q12 and Q22 may be different, as long as Q11>Q21 and Q12>Q22 are satisfied.

In the embodiment, two current control MOS transistors and two current detection MOS transistors are provided in parallel. Alternatively, three or more transistors may be provided in parallel so that the transistors are operated within respective current ranges different from one another.

In the embodiment, the common connection side (the side of the input terminal VIN) of the current control MOS transistor Q11 and the current detection MOS transistor Q21 is defined as a source terminal and the opposite thereof as a drain terminal. The common connection side (the side of the input terminal VIN) of the transistors Q11 and Q21 may be deemed as a drain terminal and the opposite thereof as a source terminal. The present invention also includes such a case.

In the current detection circuit 12 in the embodiment and modifications, the current-voltage conversion resistors Rp1 and Rp2 connected in series to the bias state control transistors Q31 and Q32, respectively, are provided as external resistors. Alternatively, on-chip resistor elements may be provided inside the chip. Furthermore, the current-voltage converter is not limited to a resistor, and may be a circuit using a transistor and the like.

In the embodiment, the bias state control transistors Q31 and Q32 are MOSFETs. Alternatively, a bipolar transistor maybe used. In this case, the bipolar transistor to be used is not a vertical transistor, but may be a lateral transistor that can be formed through a CMOS process.

The present invention is described above by using an example where the present invention is applied to a current control circuit constituting a charging device that uses a solar battery as a primary power source. The present invention, however, is not limited to such a case and can be applied to a current control circuit of a charging device that uses a power generator as a primary power source. Such a power generator generates power using naturally present resources, such as wind-power and wave-power, and has a large fluctuation in the amount of power generation. Alternatively, the present invention can be applied to a current control circuit of a DC power source circuit such as a series regulator.

According to a preferred embodiment of the present invention, there is provided a current control circuit comprising: a first current control MOS transistor and a second current control MOS transistor that are connected in parallel to each other between a voltage input terminal and an output terminal and that control a current flowing from the voltage input terminal to the output terminal; a current detection circuit comprising: a first current detection MOS transistor that has a smaller size than the first current control MOS transistor, and whose source terminal is connected to a source terminal of the first current control MOS transistor; and a second current detection MOS transistor that has a smaller size than the second current control MOS transistor, and whose source terminal is connected to a source terminal of the second current control MOS transistor, wherein a same gate voltage is applied to a gate terminal of the first current detection MOS transistor and a gate terminal of the second current detection MOS transistor; a first terminal to which a first current-voltage converter connected in series to the first current detection MOS transistor is connected; and a second terminal to which a second current-voltage converter connected in series to the second current detection MOS transistor is connected; and a gate voltage control circuit that controls gate voltages of the first and second current control MOS transistors according to a current value detected in the current detection circuit, wherein a control state of the current control circuit includes a first control state where an output from the gate voltage control circuit is applied to a control terminal of the first current control MOS transistor and a control terminal of the first current detection MOS transistor, and a second control state where the output from the gate voltage control circuit is applied to a control terminal of the second current control MOS transistor and a control terminal of the second current detection MOS transistor.

According to the configuration above, the current flowing through the current control MOS transistors is detected in a current mirror method, thus reducing a loss in power in the current-voltage converters (sense registers). Furthermore, setting different current detection ranges between the first and second current-voltage converters allows precise current control even in the case where a controllable charging-current range is widened.

Preferably, the current control circuit further comprising: a first switching circuit capable of supplying one of a voltage converted by the first current-voltage converter and a voltage converted by the second current-voltage converter to the gate voltage control circuit; a second switching circuit capable of supplying the output from the gate voltage control circuit to one of the control terminal of the first current control MOS transistor and the control terminal of the first current detection MOS transistor, and the control terminal of the second current control MOS transistor and the control terminal of the second current detection MOS transistor; and a switching control circuit that receives the voltages converted by the first and second current-voltage converters as an input and generates a switching control signal switching between the first and second switching circuits.

Providing the first and second switching circuits allows the gate voltage control circuit to operate in common in the first and second control states, thus preventing an increase in the size of circuit.

Preferably, the current control circuit further comprising: a first switch that is switchable between ON and OFF, the first switch provided between the first current detection MOS transistor and the first current-voltage converter; and a second switch that is switchable between ON and OFF, the second switch provided between the second current detection MOS transistor and the second current-voltage converter, wherein when the output from the gate voltage control circuit is supplied to the control terminal of the first current detection MOS transistor, the first switch is in an ON state and the second switch is in an OFF state; and when the output from the gate voltage control circuit is supplied to the control terminal of the second current detection MOS transistor, the first switch is in an OFF state and the second switch is in an ON state.

As described above, the first and second switches switchable between ON and OFF are provided between the first and second current detection MOS transistors and the first and second current-voltage converters, respectively. Thus, the detection current is prevented from flowing to one of the current detection systems while the other is being operated, thus preventing the current from flowing wastefully.

Preferably, the current control circuit further comprising: a first calculation amplifier circuit that receives a drain voltage of the first current control MOS transistor and a drain voltage of the first current detection MOS transistor as an input; a second calculation amplifier circuit that receives a drain voltage of the second current control MOS transistor and a drain voltage of the second current detection MOS transistor as an input;
a first bias state control transistor connected between the first current detection MOS transistor and the first current-voltage converter that is connected to a ground point; and a second bias state control transistor connected between the second current detection MOS transistor and the second current-voltage converter that is connected to the ground point, wherein an output from the first calculation amplifier circuit is applied to a control terminal of the first bias state control transistor so that the drain voltage of the first current control MOS transistor and the drain voltage of the first current detection MOS transistor are at an identical potential; and an output from the second calculation amplifier circuit is applied to a control terminal of the second bias state control transistor so that the drain voltage of the second current control MOS transistor and the drain voltage of the second current detection MOS transistor are at an identical potential.

Thus, the bias conditions of the current control MOS transistors and the current detection MOS transistors are identical, thereby enhancing current detection accuracy by flowing current having a highly-accurate current proportion.

Preferably, the current control circuit further comprising: a voltage monitor that monitors a voltage input to the voltage input terminal, wherein when the voltage monitor detects that the voltage input to the voltage input terminal is reduced to a predetermined voltage or lower, one of an internal regulator and a current source is turned off, the internal regulator generating a power voltage to operate an internal circuit including the current detection circuit and the gate voltage control circuit, and the current source supplying an operating current to the current detection circuit and the gate voltage control circuit.

Thus, in the case where the input voltage is reduced to the predetermined voltage or lower, the current control circuit is deactivated. This prevents a situation where the charging current cannot be precisely detected, resulting in impossibility of controlling current, due to an effect of offset voltage of the differential amplifier because of an extremely small difference in voltage between the source and drain of the current control transistor.

According to the present invention, the current control circuit that detects the current flowing through the current control MOS transistor in the current-mirror method to control the charging current can control the current precisely even in the case where a controllable charging-current range is widen.

It should be understood that the embodiments disclosed above are not restrictive but illustrative only in all respects. The scope of the invention is intended to be shown not by the descriptions above but by the scope of the claims that follow. The scope of the invention is intended to include the equivalents thereof and all the modifications within the scope of the invention.

The entire disclosure of Japanese Patent Application No. 2010-223551 filed on Oct. 1, 2010 including description, claims, drawings, and abstract are incorporated herein by reference in its entirety.

What is claimed is:

1. A current control circuit comprising:
a first current control MOS transistor and a second current control MOS transistor that are connected in parallel to each other between a voltage input terminal and an output terminal and that control a current flowing from the voltage input terminal to the output terminal;
a current detection circuit comprising:
a first current detection MOS transistor that has a smaller size than the first current control MOS transistor, and whose source terminal is connected to a source terminal of the first current control MOS transistor; and
a second current detection MOS transistor that has a smaller size than the second current control MOS transistor, and whose source terminal is connected to a source terminal of the second current control MOS transistor, wherein a same gate voltage is applied to a gate terminal of the first current detection MOS transistor and a gate terminal of the second current detection MOS transistor;
a first terminal to which a first current-voltage converter connected in series to the first current detection MOS transistor is connected; and
a second terminal to which a second current-voltage converter connected in series to the second current detection MOS transistor is connected; and
a gate voltage control circuit that controls gate voltages of the first and second current control MOS transistors according to a current value detected in the current detection circuit, wherein
a control state of the current control circuit includes a first control state where an output from the gate voltage control circuit is applied to a control terminal of the first current control MOS transistor and a control terminal of the first current detection MOS transistor, and a second control state where the output from the gate voltage control circuit is applied to a control terminal of the second current control MOS transistor and a control terminal of the second current detection MOS transistor.

2. The current control circuit according to claim 1, further comprising:
a first switching circuit capable of supplying one of a voltage converted by the first current-voltage converter and a voltage converted by the second current-voltage converter to the gate voltage control circuit;
a second switching circuit capable of supplying the output from the gate voltage control circuit to one of the control terminal of the first current control MOS transistor and the control terminal of the first current detection MOS transistor, and the control terminal of the second current control MOS transistor and the control terminal of the second current detection MOS transistor; and a switching control circuit that receives the voltages converted by the first and second current-voltage converters as an input and generates a switching control signal switching between the first and second switching circuits.

3. The current control circuit according to claim 1, further comprising:

a first switch that is switchable between ON and OFF, the first switch provided between the first current detection MOS transistor and the first current-voltage converter; and a second switch that is switchable between ON and OFF, the second switch provided between the second current detection MOS transistor and the second current-voltage converter, wherein when the output from the gate voltage control circuit is supplied to the control terminal of the first current detection MOS transistor, the first switch is in an ON state and the second switch is in an OFF state; and when the output from the gate voltage control circuit is supplied to the control terminal of the second current detection MOS transistor, the first switch is in an OFF state and the second switch is in an ON state.

4. The current control circuit according to claim 2, further comprising:

a first switch that is switchable between ON and OFF, the first switch provided between the first current detection MOS transistor and the first current-voltage converter; and a second switch that is switchable between ON and OFF, the second switch provided between the second current detection MOS transistor and the second current-voltage converter, wherein when the output from the gate voltage control circuit is supplied to the control terminal of the first current detection MOS transistor, the first switch is in an ON state and the second switch is in an OFF state; and when the output from the gate voltage control circuit is supplied to the control terminal of the second current detection MOS transistor, the first switch is in an OFF state and the second switch is in an ON state.

5. The current control circuit according to claim 1, further comprising:

a first calculation amplifier circuit that receives a drain voltage of the first current control MOS transistor and a drain voltage of the first current detection MOS transistor as an input;

a second calculation amplifier circuit that receives a drain voltage of the second current control MOS transistor and a drain voltage of the second current detection MOS transistor as an input;

a first bias state control transistor connected between the first current detection MOS transistor and the first current-voltage converter that is connected to a ground point; and a second bias state control transistor connected between the second current detection MOS transistor and the second current-voltage converter that is connected to the ground point, wherein an output from the first calculation amplifier circuit is applied to a control terminal of the first bias state control transistor so that the drain voltage of the first current control MOS transistor and the drain voltage of the first current detection MOS transistor are at an identical potential; and an output from the second calculation amplifier circuit is applied to a control terminal of the second bias state control transistor so that the drain voltage of the second current control MOS transistor and the drain voltage of the second current detection MOS transistor are at an identical potential.

6. The current control circuit according to claim 2, further comprising:

a first calculation amplifier circuit that receives a drain voltage of the first current control MOS transistor and a drain voltage of the first current detection MOS transistor as an input;

a second calculation amplifier circuit that receives a drain voltage of the second current control MOS transistor and a drain voltage of the second current detection MOS transistor as an input;

a first bias state control transistor connected between the first current detection MOS transistor and the first current-voltage converter that is connected to a ground point; and a second bias state control transistor connected between the second current detection MOS transistor and the second current-voltage converter that is connected to the ground point, wherein an output from the first calculation amplifier circuit is applied to a control terminal of the first bias state control transistor so that the drain voltage of the first current control MOS transistor and the drain voltage of the first current detection MOS transistor are at an identical potential; and an output from the second calculation amplifier circuit is applied to a control terminal of the second bias state control transistor so that the drain voltage of the second current control MOS transistor and the drain voltage of the second current detection MOS transistor are at an identical potential.

7. The current control circuit according to claim 3, further comprising:

a first calculation amplifier circuit that receives a drain voltage of the first current control MOS transistor and a drain voltage of the first current detection MOS transistor as an input;

a second calculation amplifier circuit that receives a drain voltage of the second current control MOS transistor and a drain voltage of the second current detection MOS transistor as an input;

a first bias state control transistor connected between the first current detection MOS transistor and the first current-voltage converter that is connected to a ground point; and a second bias state control transistor connected between the second current detection MOS transistor and the second current-voltage converter that is connected to the ground point, wherein an output from the first calculation amplifier circuit is applied to a control terminal of the first bias state control transistor so that the drain voltage of the first current control MOS transistor and the drain voltage of the first current detection MOS transistor are at an identical potential; and an output from the second calculation amplifier circuit is applied to a control terminal of the second bias state control transistor so that the drain voltage of the second current control MOS transistor and the drain voltage of the second current detection MOS transistor are at an identical potential.

8. The current control circuit according to claim 4, further comprising:
a first calculation amplifier circuit that receives a drain voltage of the first current control MOS transistor and a drain voltage of the first current detection MOS transistor as an input;
a second calculation amplifier circuit that receives a drain voltage of the second current control MOS transistor and a drain voltage of the second current detection MOS transistor as an input;
a first bias state control transistor connected between the first current detection MOS transistor and the first current-voltage converter that is connected to a ground point; and
a second bias state control transistor connected between the second current detection MOS transistor and the second current-voltage converter that is connected to the ground point, wherein
an output from the first calculation amplifier circuit is applied to a control terminal of the first bias state control transistor so that the drain voltage of the first current control MOS transistor and the drain voltage of the first current detection MOS transistor are at an identical potential; and
an output from the second calculation amplifier circuit is applied to a control terminal of the second bias state control transistor so that the drain voltage of the second current control MOS transistor and the drain voltage of the second current detection MOS transistor are at an identical potential.

9. The current control circuit according to claim 1, further comprising:
a voltage monitor that monitors a voltage input to the voltage input terminal, wherein
when the voltage monitor detects that the voltage input to the voltage input terminal is reduced to a predetermined voltage or lower, one of an internal regulator and a current source is turned off, the internal regulator generating a power voltage to operate an internal circuit including the current detection circuit and the gate voltage control circuit, and the current source supplying an operating current to the current detection circuit and the gate voltage control circuit.

10. The current control circuit according to claim 2, further comprising:
a voltage monitor that monitors a voltage input to the voltage input terminal, wherein
when the voltage monitor detects that the voltage input to the voltage input terminal is reduced to a predetermined voltage or lower, one of an internal regulator and a current source is turned off, the internal regulator generating a power voltage to operate an internal circuit including the current detection circuit and the gate voltage control circuit, and the current source supplying an operating current to the current detection circuit and the gate voltage control circuit.

11. The current control circuit according to claim 3, further comprising:
a voltage monitor that monitors a voltage input to the voltage input terminal, wherein
when the voltage monitor detects that the voltage input to the voltage input terminal is reduced to a predetermined voltage or lower, one of an internal regulator and a current source is turned off, the internal regulator generating a power voltage to operate an internal circuit including the current detection circuit and the gate voltage control circuit, and the current source supplying an operating current to the current detection circuit and the gate voltage control circuit.

12. The current control circuit according to claim 4, further comprising:
a voltage monitor that monitors a voltage input to the voltage input terminal, wherein
when the voltage monitor detects that the voltage input to the voltage input terminal is reduced to a predetermined voltage or lower, one of an internal regulator and a current source is turned off, the internal regulator generating a power voltage to operate an internal circuit including the current detection circuit and the gate voltage control circuit, and the current source supplying an operating current to the current detection circuit and the gate voltage control circuit.

13. The current control circuit according to claim 5, further comprising:
a voltage monitor that monitors a voltage input to the voltage input terminal, wherein
when the voltage monitor detects that the voltage input to the voltage input terminal is reduced to a predetermined voltage or lower, one of an internal regulator and a current source is turned off, the internal regulator generating a power voltage to operate an internal circuit including the current detection circuit and the gate voltage control circuit, and the current source supplying an operating current to the current detection circuit and the gate voltage control circuit.

14. The current control circuit according to claim 6, further comprising:
a voltage monitor that monitors a voltage input to the voltage input terminal, wherein
when the voltage monitor detects that the voltage input to the voltage input terminal is reduced to a predetermined voltage or lower, one of an internal regulator and a current source is turned off, the internal regulator generating a power voltage to operate an internal circuit including the current detection circuit and the gate voltage control circuit, and the current source supplying an operating current to the current detection circuit and the gate voltage control circuit.

15. The current control circuit according to claim 7, further comprising:
a voltage monitor that monitors a voltage input to the voltage input terminal, wherein
when the voltage monitor detects that the voltage input to the voltage input terminal is reduced to a predetermined voltage or lower, one of an internal regulator and a current source is turned off, the internal regulator generating a power voltage to operate an internal circuit including the current detection circuit and the gate voltage control circuit, and the current source supplying an operating current to the current detection circuit and the gate voltage control circuit.

16. The current control circuit according to claim 8, further comprising:
a voltage monitor that monitors a voltage input to the voltage input terminal, wherein
when the voltage monitor detects that the voltage input to the voltage input terminal is reduced to a predetermined voltage or lower, one of an internal regulator and a current source is turned off, the internal regulator generating a power voltage to operate an internal circuit including the current detection circuit and the gate voltage control circuit, and the current source supplying an operating current to the current detection circuit and the gate voltage control circuit.

* * * * *